United States Patent
Kim et al.

(10) Patent No.: US 9,441,730 B2
(45) Date of Patent: Sep. 13, 2016

(54) SHIFT LEVER ASSEMBLY FOR AUTOMATIC TRANSMISSION VEHICLE

(71) Applicants: Hyundai Motor Company, Seoul (KR); Kia Motors Corporation, Seoul (KR)

(72) Inventors: Deok Ki Kim, Hwaseong-si (KR); Myung Lyul Na, Hwaseong-si (KR); Min Keun Kwon, Bucheon-si (KR); Won Jin Jeong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 337 days.

(21) Appl. No.: 14/104,838

(22) Filed: Dec. 12, 2013

(65) Prior Publication Data
US 2015/0101437 A1   Apr. 16, 2015

(30) Foreign Application Priority Data
Oct. 11, 2013 (KR) .................. 10-2013-0121262

(51) Int. Cl.
*F16H 59/10* (2006.01)
*F16H 59/02* (2006.01)

(52) U.S. Cl.
CPC .......... *F16H 59/10* (2013.01); *F16H 59/0204* (2013.01); *F16H 2059/0239* (2013.01); *Y10T 74/20104* (2015.01)

(58) Field of Classification Search
CPC ............. Y10T 74/20067; F16H 59/10; F16H 59/0204; F16H 2059/0239
See application file for complete search history.

(56) References Cited

U.S. PATENT DOCUMENTS

| | | | | |
|---|---|---|---|---|
| 5,899,115 A | * | 5/1999 | Kataumi | F16H 59/0204 74/473.12 |
| 5,927,150 A | * | 7/1999 | Hirano | F16H 59/0204 74/473.18 |
| 6,082,213 A | * | 7/2000 | Skogward | F16H 59/0204 74/473.12 |
| 6,098,483 A | * | 8/2000 | Syamoto | F16H 59/10 74/473.12 |
| 6,148,686 A | * | 11/2000 | Kataumi | F16H 59/0204 74/473.12 |
| 6,230,579 B1 | * | 5/2001 | Reasoner | F16H 59/0204 74/473.18 |
| 2001/0042418 A1 | * | 11/2001 | Junge | F16H 59/0204 74/473.18 |
| 2004/0025615 A1 | * | 2/2004 | Nagasawa | F16H 59/0204 74/473.1 |
| 2006/0053930 A1 | * | 3/2006 | Morita | F16H 59/10 74/473.18 |

FOREIGN PATENT DOCUMENTS

| | | |
|---|---|---|
| JP | 10-006800 A | 1/1998 |
| KR | 1998-052839 A | 9/1998 |
| KR | 1999-001226 A | 1/1999 |
| KR | 1020020037538 A | 5/2002 |
| KR | 1020040057441 A | 7/2004 |
| KR | 20-0373194 Y1 | 1/2005 |
| KR | 100783516 B1 | 12/2007 |

* cited by examiner

*Primary Examiner* — David M Fenstermacher

(57) ABSTRACT

A shift lever assembly for an automatic transmission vehicle may include a shift lever installed rotatably front/rearward and left/rightward with respect to a shift lever housing through a ball joint, a cable bracket disposed on a front of the shift lever and connected to the shift lever housing to be moved front/rearward with respect to the shift lever housing, and a cable connection protrusion is provided on a tip end of the cable bracket to connect with a shift cable, and an engaging lever disposed on the front of the shift lever for connecting the shift lever and the cable bracket. The shift lever assembly can have a reduced size and prevent formation the shaking angle of the shift cable, and accordingly, improve the power transmission efficiency and a transmission efficiency of the shift cable.

7 Claims, 10 Drawing Sheets

SHIFT LEVER ASSEMBLY FOR AUTOMATIC TRANSMISSION VEHICLE

CROSS-REFERENCE TO RELATED APPLICATION

The present application claims priority of Korean Patent Application Number 10-2013-0121262 filed Oct. 11, 2013, the entire contents of which application are incorporated herein for all purposes by this reference.

BACKGROUND OF INVENTION

1. Field of Invention

The present invention relates to a shift lever assembly for an automatic transmission vehicle, and more particularly, to a shift lever assembly for an automatic transmission vehicle where an engaging lever is installed on a front of the shift lever.

2. Description of Related Art

As shown in FIGS. 1 to 3, a driver can select an automatic mode or a sports mode depending on his/her necessity in the shift lever assembly for an automatic transmission vehicle provided with a shift lever 1 and an engaging lever 2.

That is, the driver can select a P (parking) range, a R (reverse) range, a N (neutral) range, and a D (driving) range by moving front/rearward the shift lever 1 along a slot 11 in the automatic mode, and select at random an up-shift (+direction) or a down-shift (−direction) by moving the shift lever 1 to a slot 12 for sports mode so as to drive more dynamically in the sports mode.

Meanwhile, when the shift lever 1 is moved along the slot 11 for automatic mode, the shift lever 1 and the engaging lever 2 are integrated to rotate front/rearward together, that is, a lever protrusion 1a provided on the shift lever 1 is inserted into a lever groove 2a provided in the engaging lever 2 to be integrated wherein the shift lever 1 and the engaging lever 2 are rotated front/rearward around the lever shaft 3 when the shift lever 1 is operated by a driver.

Further, when the shift lever 1 is moved to the slot 12 for sports mode from the slot 11 for automatic mode, only the shift lever 1 is rotated to one side around a lever pin 4 and thus the lever protrusion 1a of the shift lever 1 is deviated from the lever groove 2a of the engaging lever 2. As a result, the shift lever 1 and the engaging lever 2 are separated and thus only the shift lever 1 is moved along the slot 12 for sports mode to perform the operation of the up-shift or the down-shift.

Meanwhile, one end of the shift cable 13 is connected to a cable connection protrusion 2b provided on the engaging lever 2 and the other end thereof is connected to a shift operation mechanism of a transmission main body.

However, according to a conventional shift lever assembly in which the engaging lever 2 is disposed on a side of the shift lever 1, the shift lever 1 is rotated and moved to one side direction of the assembly so as to be operated as the sports mode and thus a width direction size M1 of a corporate body of the shift lever 1 and the engaging lever 2 has to be designed considering a side direction rotational moving distance of the shift lever 1, thereby making the whole size of the shift lever assembly great.

When the whole size of the shift lever assembly becomes great as described in the forgoing, it reverses the latest trend for seeking light-weight and fuel ratio improvement of the shift lever assembly.

Further, when the shift lever 1 is moved along the slot 11 for automatic mode, the cable connection protrusion 2b of the engaging lever 2, to which the shift cable 13 is connected, is moved along a rotational radius around a lever shaft 3 as shown in FIG. 4, wherein it is known that a shaking angle θ1 is produced between two center lines L1, L2 due to the rotational movement of the cable connection protrusion 2b, comparing to the longitudinal direction center lines L1, L2 of the shift cable 13 when the shift lever 1 is disposed on each of the P range and the D range.

The shaking angle θ1 is gradually becoming greater as the shift lever 1 is moved from the P range toward the D range wherein the power transmission efficiency of the shift cable 13 is decreased due to the shaking angle θ1, thereby decreasing shift efficiency.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of present invention have been made in an effort to solve at least some of the problems of the related art. Various aspects of the present invention provide for a shift lever assembly in which an engaging lever is arranged on a front of a shift lever to reduce a width directional size of a corporate body of the shift lever and the engaging lever and thus the whole size of the shift lever assembly can be reduced to help light-weighting and fuel ratio improvement.

Various aspects of the present invention provide for a shift lever assembly in which the shaking angle is not formed when the shift lever moves along the slot for an automatic mode, thereby improving the power transmission efficiency and shift efficiency of the shift cable.

Various aspects of the present invention provide for a shift lever assembly for an automatic transmission vehicle that may include: a shift lever that is installed rotatably front/rearward and left/rightward with respect to a shift lever housing through a ball joint provided on a lower part thereof; a cable bracket which is disposed on a front of the shift lever and connected to the shift lever housing to be moved front/rearward with respect to the shift lever housing, and on a tip end of the cable bracket a cable connection protrusion to which one end of a shift cable is connected is provided; and an engaging lever which is disposed on the front of the shift lever and provided for connecting the shift lever and the cable bracket, wherein the engaging lever moves together with the shift lever when the shift lever moves front/rearward along a slot for an automatic mode, guides a left/right movement of the shift lever when the shift lever moves left/rightward along a channel between the slot for the automatic mode and a slot for a sports mode, and axial-rotates left/rightward with respect to the cable bracket when the shift lever moves left/rightward along the slot for the sports mode.

Guide holes may be formed on both sides of the cable bracket, respectively, each of which is extended along a front/rear direction to which the cable bracket moves, and a pair of guide pins may be formed in the shift lever housing, wherein a tip end of a respective guide pin in the pair of guide pins is fitted into a corresponding guide hole in the guide holes formed on the cable bracket to guide a front/rear movement of the cable bracket while connecting the shift lever housing and the cable bracket.

A lever bush may be provided on a rear upper surface of the cable bracket to be protruded upward such that the engaging lever is connected to the cable bracket to axial-rotate left/rightward with respect to the cable bracket, and a bush groove into which the lever bush is inserted may be formed on a bottom surface of the engaging lever.

A left protrusion and a right protrusion that are shaped substantially identically may be formed and protruded upward on upper left and right parts of the engaging lever, respectively, and a protrusion groove into which the left protrusion and the right protrusion are fitted and which guides the left/right movement of the shift lever by the left protrusion and the right protrusion may be formed to pass through both sides of the cable bracket on the front of the shift lever, facing an upper surface of the engaging lever.

A pair of housing guide grooves that are extended along a front/rear direction to which the engaging lever moves may be formed on an inner side surface of the shift lever housing to guide a front/rear movement of the engaging lever when the engaging lever and the shift lever move front/rearward together, and the lever guide protrusions which move along the housing guide grooves while being inserted into the housing guide grooves may be formed integrally and protruded on both side surfaces of the engaging lever, respectively.

When the shift lever, the engaging lever and the cable bracket move together front/rearward along the slot for the automatic mode, the engaging lever may be connected to be rotated front/rearward around the lever bush to prevent formation of an up-down directional shaking angle of the shift cable connected to the cable connection protrusion.

When the shift lever moves front/rearward along the slot for the automatic mode, both the left protrusion and the right protrusion of the engaging lever may be fitted into the protrusion groove of the shift lever. When the shift lever moves front/rearward along the slot for the sports mode, one of the left or right protrusion of the engaging lever may be fitted into the protrusion groove of the shift lever.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
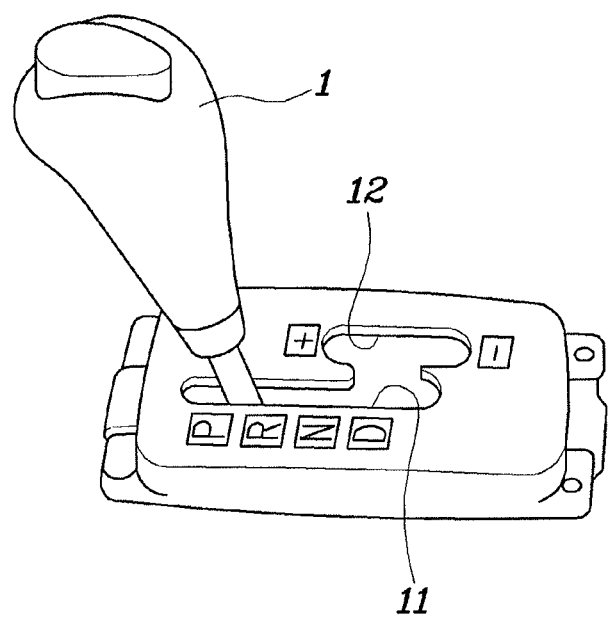
FIG. 1 is a perspective view showing an exemplary shift lever assembly for an automatic transmission vehicle, which can be shifted to a sports mode, according to the present invention.
Figure 2:
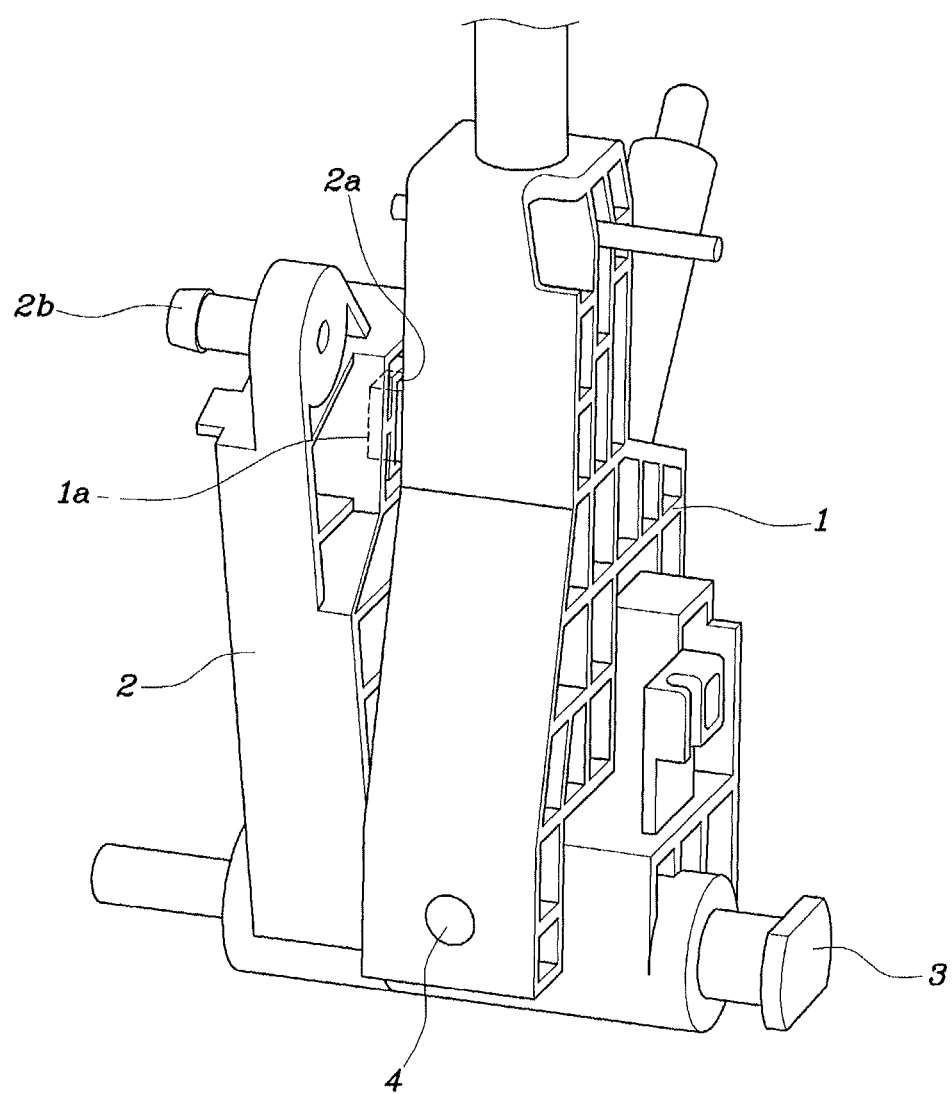
FIG. 2 is a perspective view showing a shift lever assembly, in which a shift lever and an engaging lever are integrated according to a related art.
Figure 3:
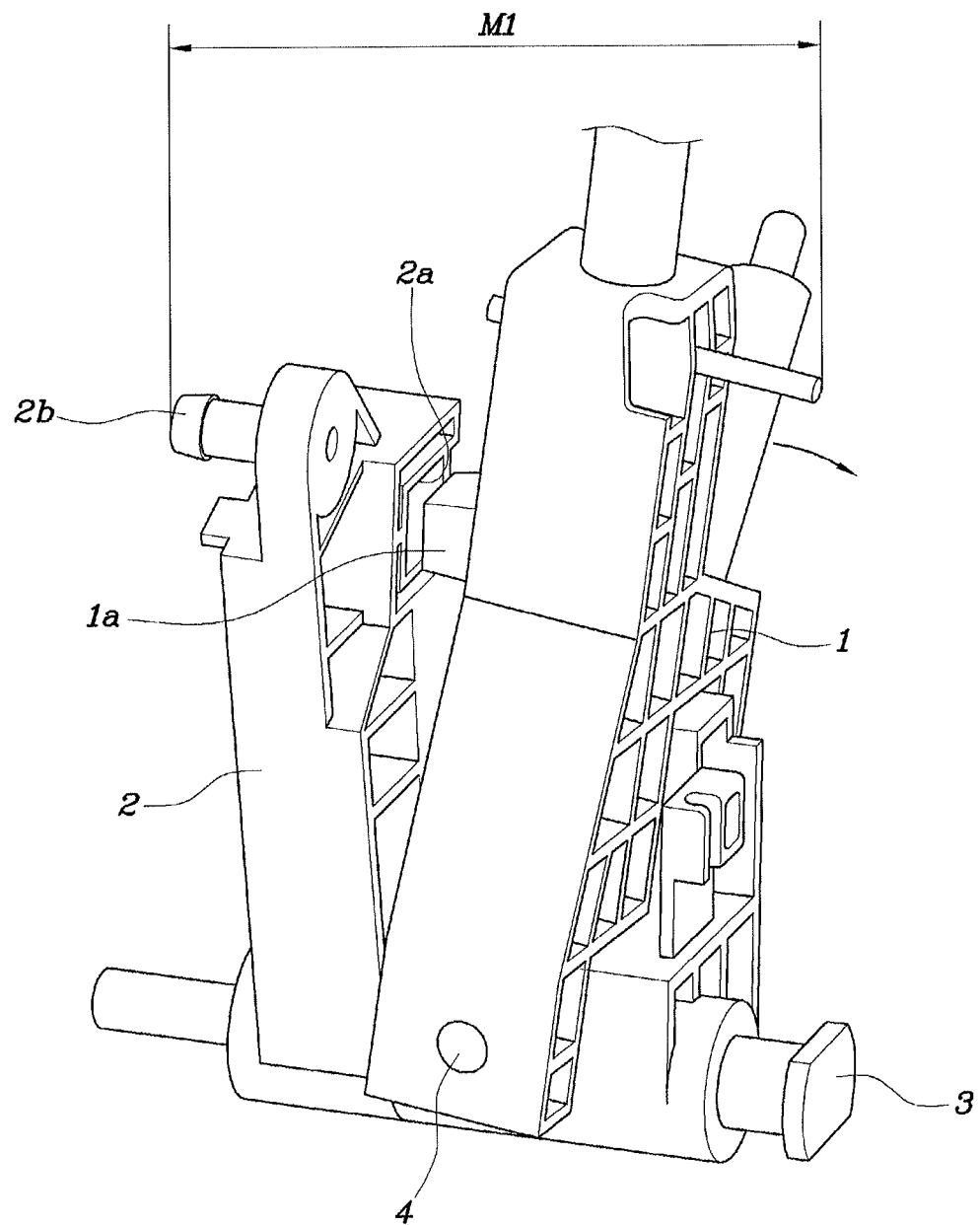
FIG. 3 is a perspective view showing a shift lever assembly as shown in FIG. 2, in which the shift lever and the engaging lever are separated while the shift lever is rotated to one side of the assembly in order to operate in a sports mode.
Figure 4:
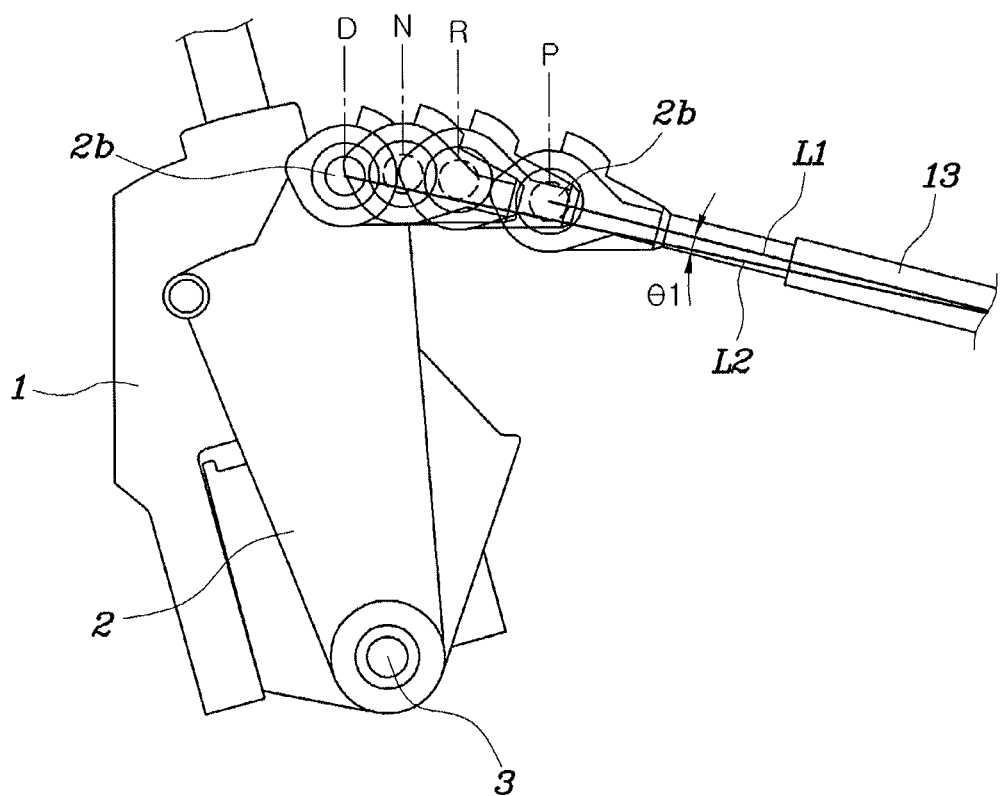
FIG. 4 is a view showing a shaking angle of a shift cable in the shift lever assembly according to a related art.
Figure 5:
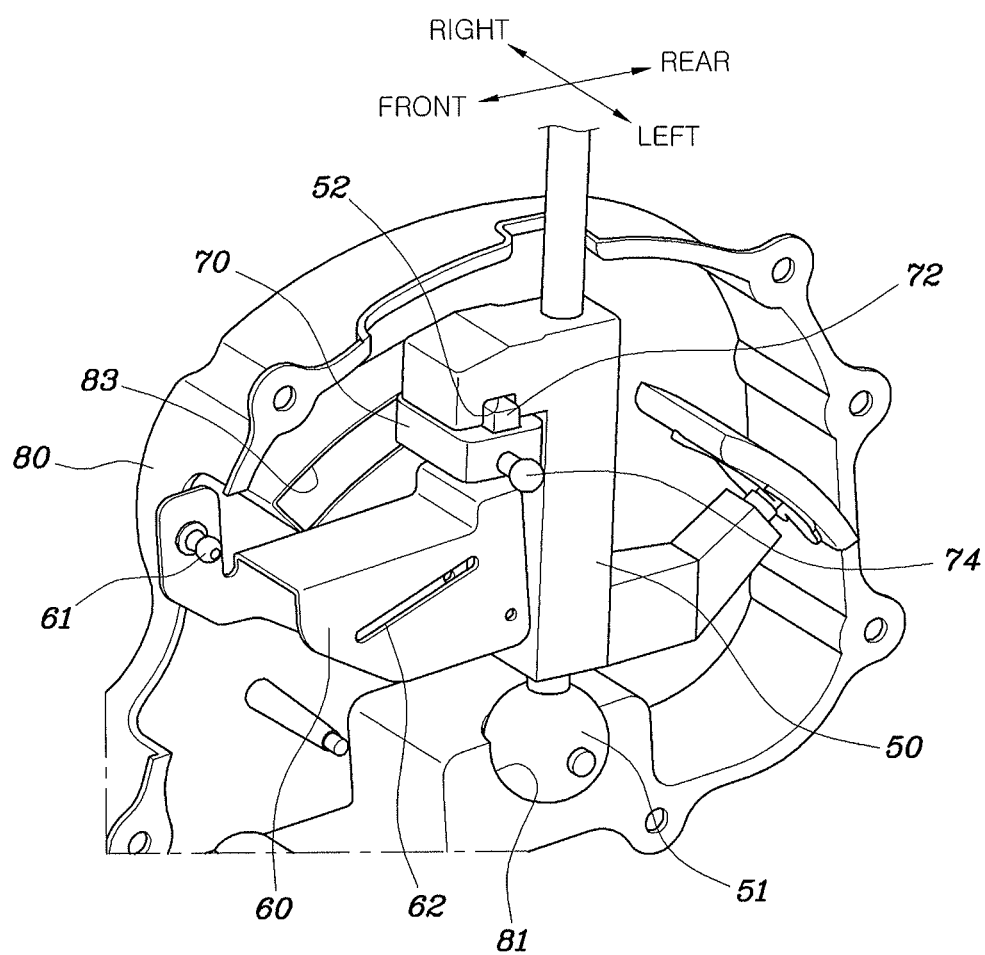
FIG. 5 is a perspective view showing an exemplary shift lever assembly for an automatic transmission vehicle which is installed in a shift lever housing according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the shift lever assembly for an automatic transmission vehicle according to the present invention, a driver selects a P (parking) range, a R (reverse) range, a N (neutral) range, and a D (driving) range by moving front/rearward along a slot 11 for automatic mode (see FIG. 1), and selects at random an up-shift (+direction) or a down-shift (−direction) by moving the shift lever to a slot 12 for sports mode capable of driving more dynamically.

That is, the shift lever assembly for an automatic transmission vehicle according to the present invention, as shown in FIGS. 5 to 10, may include: a shift lever 50 that is installed rotatably front/rearward and left/rightward with respect to a shift lever housing 80 through a ball joint 51 provided on a lower part thereof; a cable bracket 60 which is disposed on a front of the shift lever 50 and connected to the shift lever housing 80 to be moved front/rearward with respect to the shift lever housing 80, and on the tip end of which a cable connection protrusion 61 to which one end of the shift cable 91 is connected is provided; and an engaging lever 70 which is disposed on a front of the shift lever 50 and provided for connecting the shift lever 50 and the cable bracket 60, and moves together with the shift lever 50 when the shift lever 50 moves front/rearward along the slot 11 for an automatic mode, guides the left/right movement of the shift lever 50 when the shift lever 50 moves left/rightward along a passage between the slot 11 for an automatic mode and the slot 12 for a sports mode, and axial-rotates left/rightward with respect to the cable bracket 60 when the shift lever 50 moves left/rightward along the slot 12 for a sports mode.

Here, a ball insertion groove 81 into which the ball joint 51 is inserted rotatably is formed in the shift lever housing 80 so as to install rotatably the ball joint 51 provided on a lower part of the shift lever 50 in the shift lever housing 80.

The guide holes 62 are formed on both sides of the cable bracket 60, respectively, each of which is extended along a front/rear direction to which the cable bracket 60 moves. Further, a pair of guide pins 82 are formed in the shift lever housing 80 wherein the tip ends of the guide pins are fitted into the guide holes 62 formed on the cable bracket 60, respectively, so as to guide the front/rear movement of the cable bracket 60 while connecting the shift lever housing 80 and the cable bracket 60. Accordingly, the cable bracket 60 is moved front/rearward with respect to the shift lever housing 80 while being guided by the guide hole 62 and the guide pin 82.

In addition, a lever bush 63 is provided on a rear upper surface of the cable bracket 60 to be protruded upward such that the engaging lever 70 is connected to the cable bracket 60 to axial-rotate left/rightward with respect to the cable bracket 60, and further a bush groove 71 that is opened downward, into which the lever bush 63 is inserted, is formed on a bottom surface of the engaging lever 70.

Here, the engaging lever 70 can axial-rotate left/rightward and also front/rearward around the lever bush 63 through the combination of the lever bush 63 and the bush groove 71.

Additionally, a left protrusion 72 and a right protrusion 73 that are shaped identically or substantially identically are formed and protruded upward on upper left and right parts of the engaging lever 70, respectively, and further a protrusion groove 52 into which the left protrusion 72 and the right protrusion 73 are fitted is formed on a front of the shift lever 50, facing the upper surface of the engaging lever 70.

Here, the protrusion grooves 52 is opened downward for the left protrusion 72 and the right protrusion 73 to be fitted therein and further passes through both sides of the shift lever 50 such that the shift lever 50 moves left/rightward while being guided by the left protrusion 72, the right protrusion 73 and the protrusion groove 52.

Further, a pair of housing guide grooves 83 that are extended along front/rear directions to which the engaging lever 70 moves are formed on an inner side surface of the shift lever housing 80 to guide the front/rear movement of the engaging lever 70 when the engaging lever 70 and the shift lever 50 move front/rearward together. In addition, the lever guide protrusions 74 which move along the housing guide groove 83 while being inserted into the housing guide groove 83 are formed integrally or monolithically to be protruded on both side surfaces of the engaging lever 70, respectively.

Meanwhile, when the shift lever 50, the engaging lever 70 and the cable bracket 60 move together front/rearward along the slot 11 for an automatic mode, the engaging lever 70 is connected to be rotated front/rearward around the lever bush 63 in order to prevent the forming of the up-down directional shaking angle of the shift cable 91 connected to the cable connection protrusion 61.

The shaking angle of the shift cable 91 refers to a certain size of angle that is formed up/downward between the longitudinal center lines of the shift cable 91 in case where the longitudinal center line of the shift cable 91 when the shift lever 50 is disposed on the P range does not correspond to the longitudinal center lines of the shift cable 91 when the shift cable is disposed on other ranges (R, N, D ranges), while the shift lever 50 moves along the slot 11 for an automatic mode. Here, if the shaking angle were formed while the shift lever 50 is operated, as in the related art, the power transmission efficiency and shift efficiency of the shift cable 91 would be decreased.

According to the present invention, when the shift lever 50 moves along the slot 11 for an automatic mode between the ranges while it rotates around the ball joint 51, the engaging lever 70 rotates front/rearward around the lever bush 63 to absorb angle difference due to the rotation of the shift lever 50.

Figure 7:
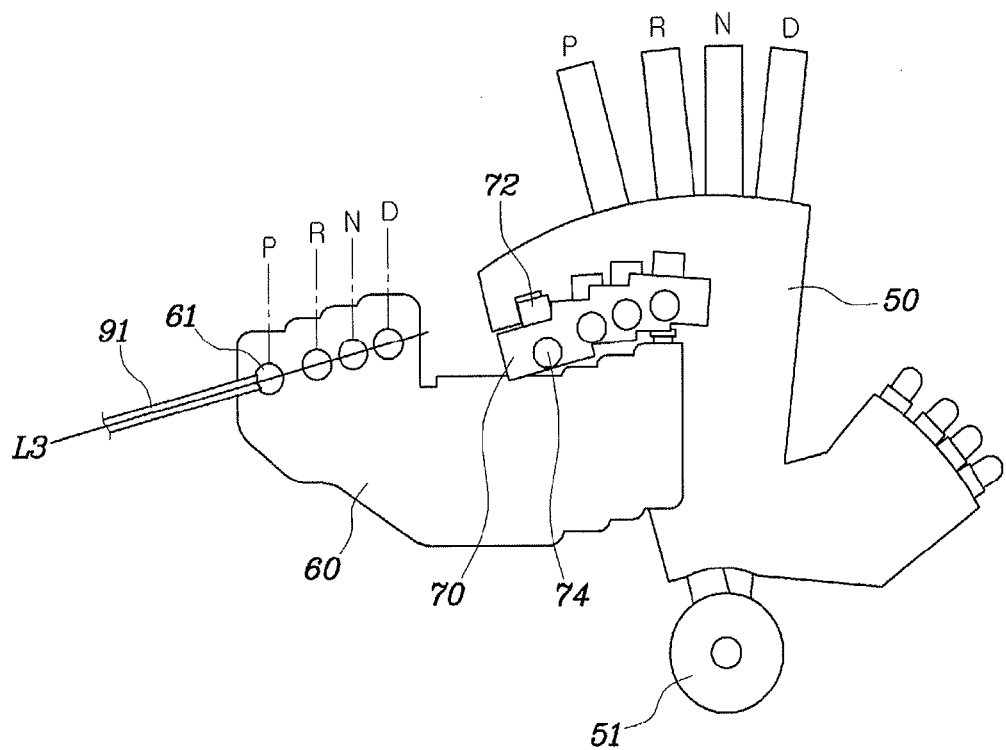
FIG. 7 is a side view showing an exemplary shift lever, an exemplary engaging lever and an exemplary cable bracket, which move along a slot for automatic mode, according to the present invention.

Accordingly, the cable connection protrusions 61 to which the shift cable 91 are connected, when the shift lever is disposed on the P range and other ranges (R, N, D ranges), are all disposed on a same line along a front/rear directions to which the cable bracket 60 moves, as shown in FIG. 7, and thus the longitudinal center line L3 of the shift cable 91 is always corresponded and thereby prevents in advance the formation of the up-down directional shaking angle of the shift cable 91 as in the related art.

Figure 6:
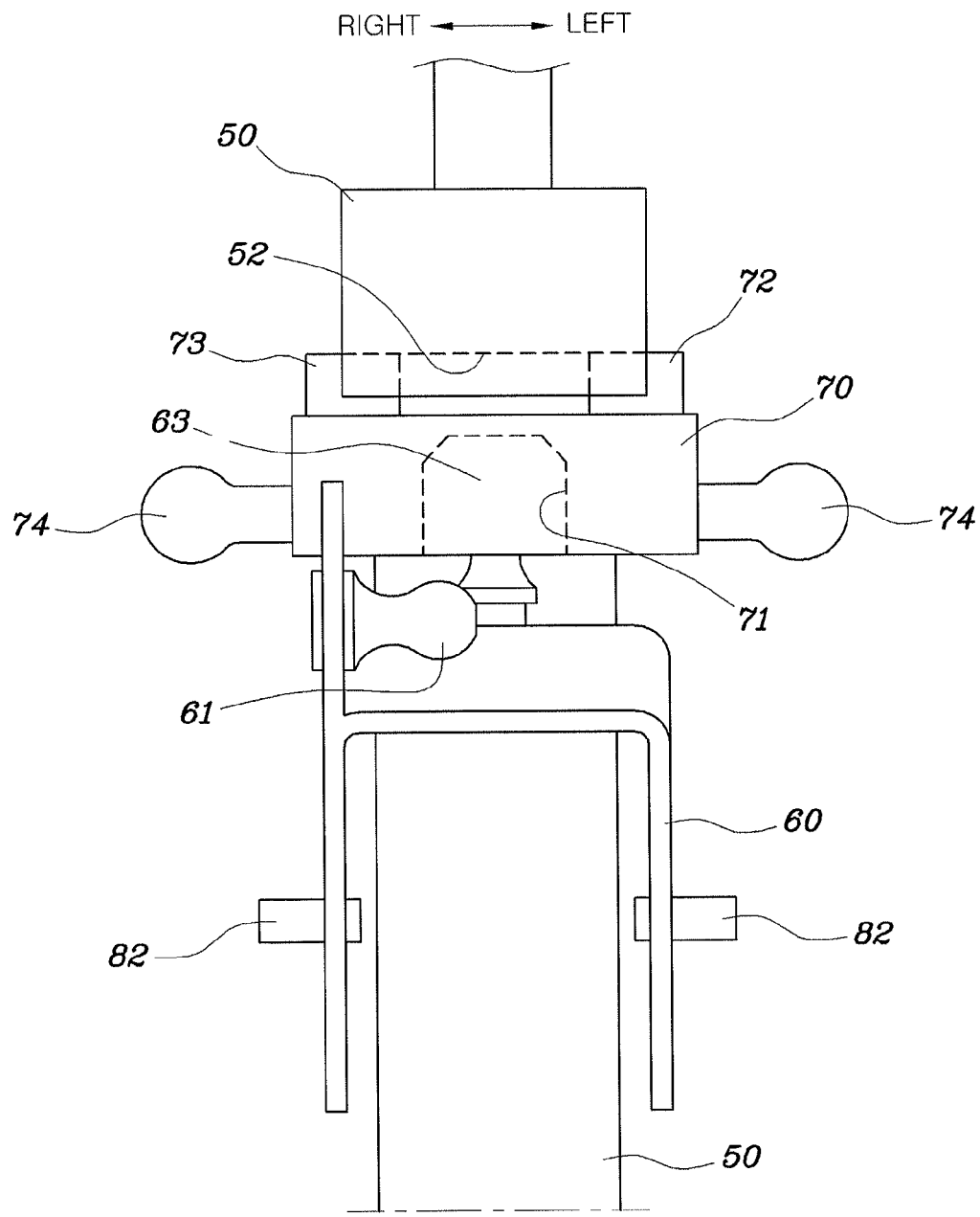
FIG. 6 is a front view showing an exemplary shift lever assembly according to the present invention.

Additionally, according to the present invention, when the shift lever 50 moves front/rearward along the slot 11 for an automatic mode, the left protrusion 72 and the right protrusion 73 of the engaging lever 70 are fitted simultaneously into the protrusion groove 52 of the shift lever 50, as shown in FIG. 6.

Accordingly, the shift lever 50 moves front/rearward along the slot 11 for an automatic mode and then the engaging lever 70 moves together with the shift lever 50, and the cable bracket 60 connected to the engaging lever 70 through the lever bush 63 moves front/rearward together.

Figure 8:
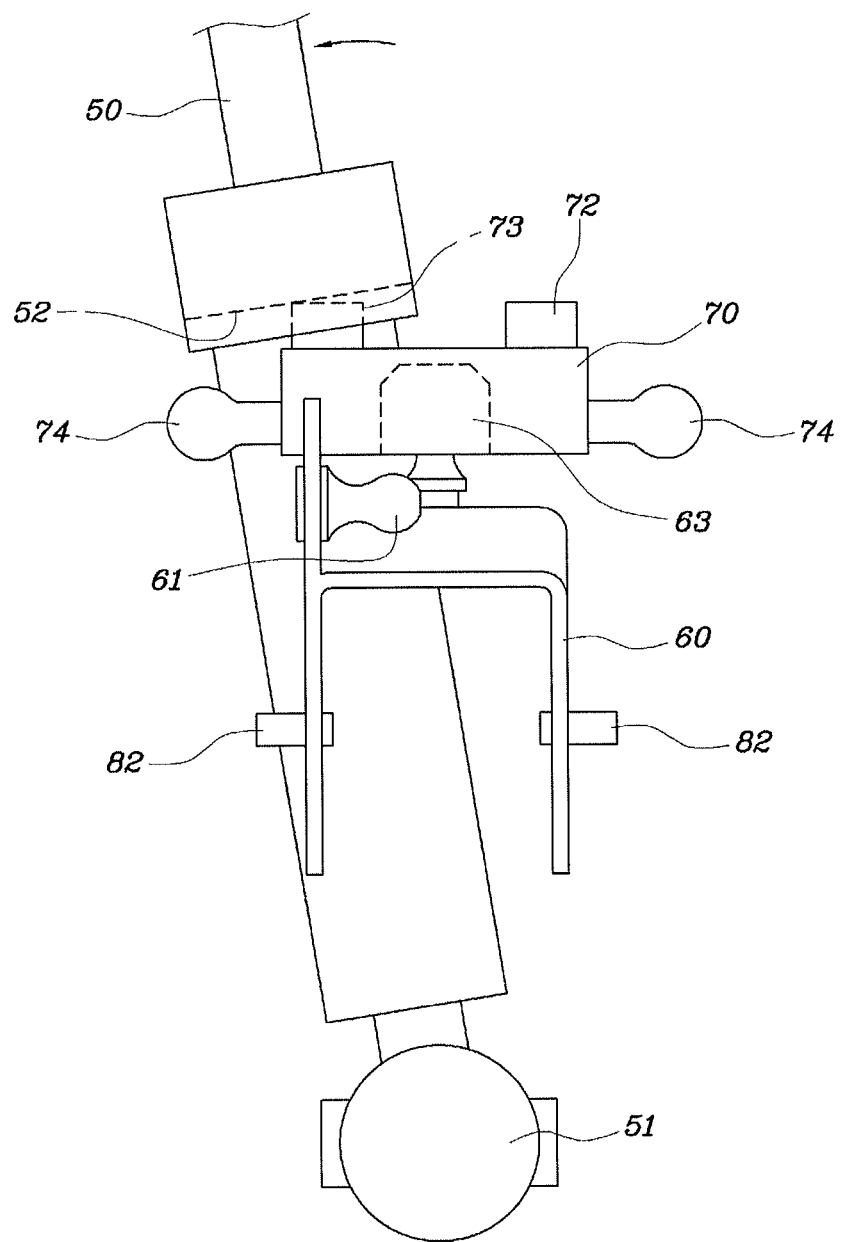
FIG. 8 is a view showing an exemplary shift lever operated in sports mode according to the present invention.
Figure 9:
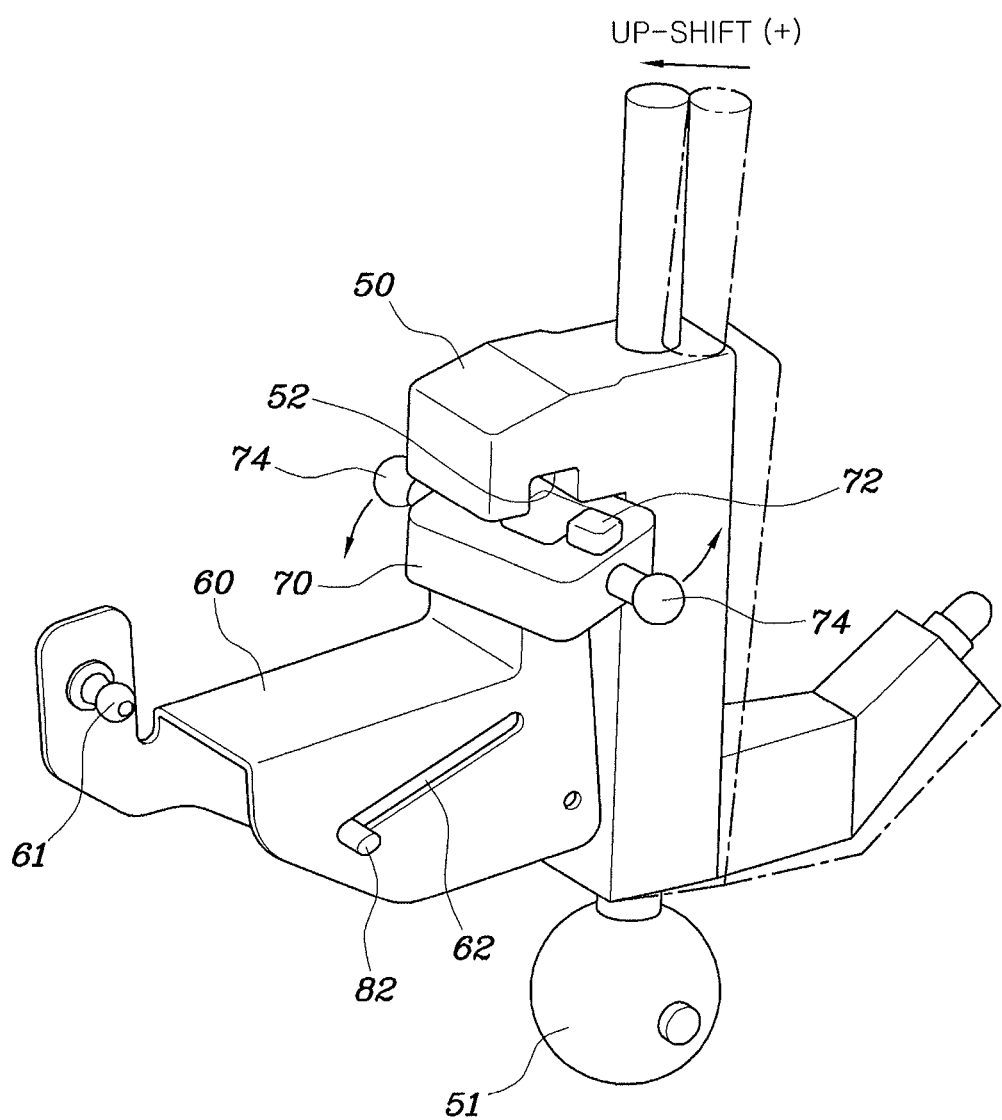
FIGS. 9 and 10 are views showing an up-shift and a down-shift of an exemplary shift lever in sports mode.

Further, according to the present invention, when the shift lever 50 moves front/rearward along the slot 12 for a sports mode, only the right protrusion 73 among the left protrusion 72 and the right protrusion 73 of the engaging lever 70 is fitted into the protrusion groove 52 of the shift lever 50, as shown in FIGS. 8 and 9.

Accordingly, when the shift lever 50 moves along the slot 12 for a sports mode to the up-shift direction (+direction, frontward), as shown in FIG. 9, only the engaging lever 70 axial-rotates counterclockwise around the lever bush with respect to the cable bracket 60, and as a result the operation force of the shift lever 50 is not transferred to the cable bracket 60 to which the shift cable 91 is connected.

Figure 10:
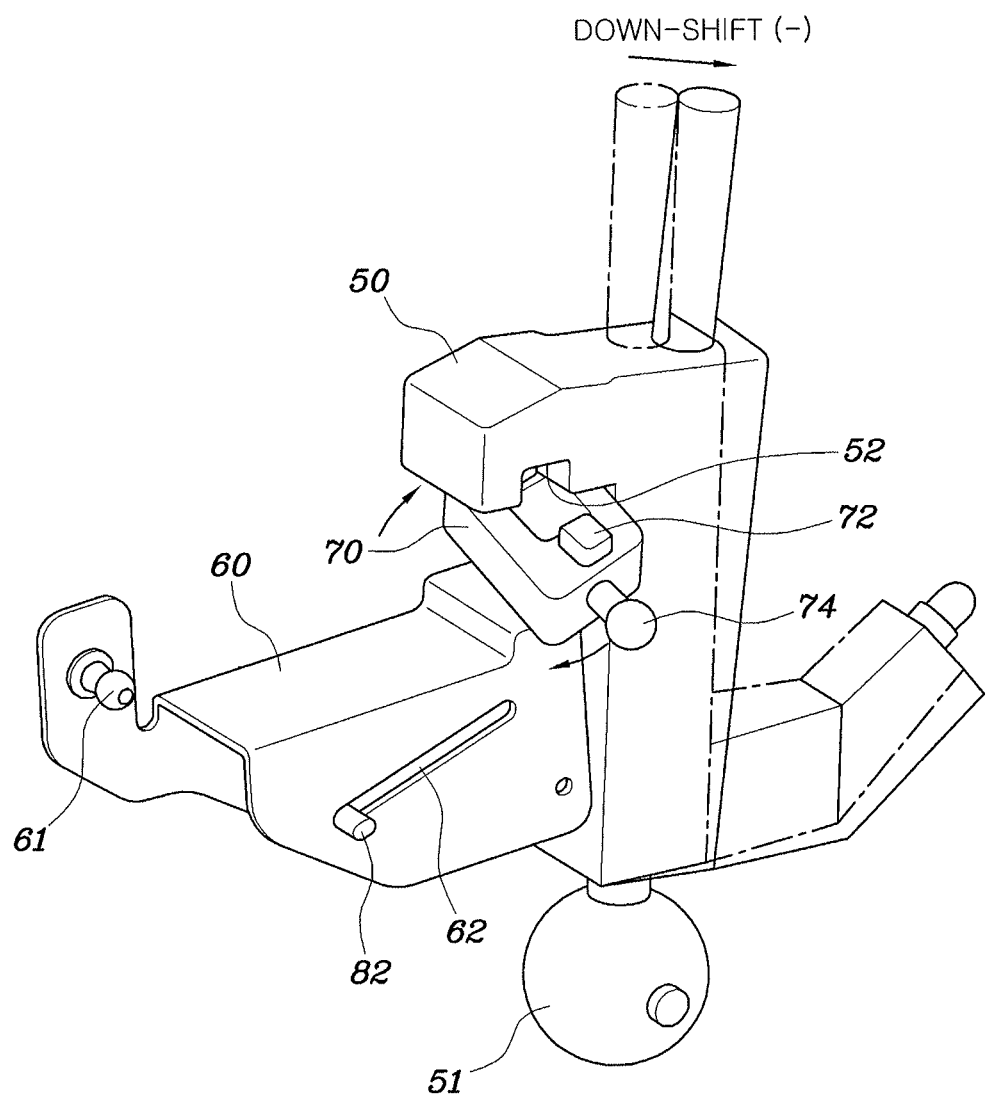

On the contrary, when the shift lever 50 moves front/rearward along the slot 12 for a sports mode to the down-shift direction (−direction, rearward), as shown in FIG. 10, only the engaging lever 70 axial-rotates around the lever bush 63 clockwise with respect to the cable bracket 60, and even at this time the operation force of the shift lever 50 is not transferred to the cable bracket 60 to which the shift cable 91 is connected.

According to the shift lever assembly for an automatic transmission vehicle of the present invention as described in the forgoing, the engaging lever 70 for operating a sports mode is disposed on a front of the shift lever, and a width direction size of the shift lever assembly including the shift lever 50 and the engaging lever 70 can be reduced greatly considering a sports mode operation of the shift lever 50, as compared to a related art, and as a result the whole size of the shift lever assembly can be reduced thereby to promote weight lightening and fuel efficiency improvement.

In addition, according to the present invention, the locations of the cable connection protrusion 61 when the shift lever 50 is disposed on the P range and other ranges (R, N, D ranges) while the shift lever 50 moves along the slot 11 for an automatic mode are placed on a same line along the front/rear directions to which the cable bracket 60 moves, and thus the longitudinal center line L 3 of the shift cable 91 is always corresponded even when the shift lever 50 is disposed variably on the ranges thereby to prevent in advance the formation of the up-down direction shaking angle of the shift cable 91.

As mentioned above, since the formation of the shaking angle of the shift cable 91 can be prevented when the shift lever 50 moves along the slot 11 for an automatic mode, there is an advantage of improving a power transmission efficiency and a shift efficiency of the shift cable.

According to the present invention, a width directional size of the shift lever assembly including the shift lever and the engaging lever can be reduced, considering the sports mode operation of the shift lever, thereby reducing the whole size of the shift lever assembly to plan light-weighting and fuel ratio improvement.

Further, according to the present invention, the shaking angle of the shift cable 91 cannot be formed when the shift lever 50 moves along the slot 11 for an automatic mode, thereby improving the power transmission efficiency and shift efficiency of the shift cable.

For convenience in explanation and accurate definition in the appended claims, the terms "upper" or "lower", "front" or "rear", 'left" or "right", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift lever assembly for an automatic transmission vehicle, comprising:
   a shift lever that is installed rotatably front/rearward and left/rightward with respect to a shift lever housing through a ball joint provided on a lower part thereof;
   a cable bracket which is disposed on a front of the shift lever and connected to the shift lever housing to be moved front/rearward with respect to the shift lever housing, and on a tip end of the cable bracket a cable connection protrusion to which one end of a shift cable is connected is provided; and
   an engaging lever which is disposed on the front of the shift lever and provided for connecting the shift lever and the cable bracket, wherein the engaging lever moves together with the shift lever when the shift lever moves front/rearward along a slot for an automatic mode, guides a left/right movement of the shift lever when the shift lever moves left/rightward along a channel between the slot for the automatic mode and a slot for a sports mode, and axial-rotates left/rightward with respect to the cable bracket when the shift lever moves left/rightward along the slot for the sports mode,
   wherein a left protrusion and a right protrusion that are shaped substantially identically are formed and protruded upward on upper left and right parts of the engaging lever, respectively, and a protrusion groove into which the left protrusion and the right protrusion are fitted and which guides the left/right movement of the shift lever by the left protrusion and the right protrusion is formed on the front of the shift lever, facing an upper surface of the engaging lever.

2. The shift lever assembly for an automatic transmission vehicle of claim 1, wherein guide holes are formed on both sides of the cable bracket, respectively, each of which is extended along a front/rear direction to which the cable bracket moves, and a pair of guide pins are formed in the shift lever housing, wherein a tip end of a respective guide pin in the pair of guide pins is fitted into a corresponding guide hole in the guide holes formed on the cable bracket to guide a front/rear movement of the cable bracket while connecting the shift lever housing and the cable bracket.

3. The shift lever assembly for an automatic transmission vehicle of claim 1, wherein a lever bush is provided on a rear upper surface of the cable bracket to be protruded upward such that the engaging lever is connected to the cable bracket to axial-rotate left/rightward with respect to the cable bracket, and a bush groove into which the lever bush is inserted is formed on a bottom surface of the engaging lever.

4. The shift lever assembly for an automatic transmission vehicle of claim 1, wherein a pair of housing guide grooves that are extended along a front/rear direction to which the engaging lever moves are formed on an inner side surface of the shift lever housing to guide a front/rear movement of the engaging lever when the engaging lever and the shift lever move front/rearward together, and lever guide protrusions which move along the housing guide grooves while being inserted into the housing guide grooves are formed integrally and protruded on both side surfaces of the engaging lever, respectively.

5. The shift lever assembly for an automatic transmission vehicle of claim 3, wherein when the shift lever, the engaging lever and the cable bracket move together front/rearward along the slot for the automatic mode, the engaging lever is connected to be rotated front/rearward around the lever bush to prevent formation of an up-down directional shaking angle of the shift cable connected to the cable connection protrusion,
   wherein the shaking angle refers to an angle formed up/downward between longitudinal center lines of the shift cable, in a case where a longitudinal center line of the shift cable when the shift lever is disposed on a P range, does not correspond to longitudinal center lines of the shift cable when the shift cable is disposed on R, D, and D ranges, while the shift lever moves along the slot for the automatic mode.

6. The shift lever assembly for an automatic transmission vehicle of claim 1, wherein when the shift lever moves front/rearward along the slot for the automatic mode, both the left protrusion and the right protrusion of the engaging lever are fitted into the protrusion groove of the shift lever.

7. The shift lever assembly for an automatic transmission vehicle of claim 1, wherein when the shift lever moves front/rearward along the slot for the sports mode, one of the left protrusion or the right protrusion of the engaging lever is fitted into the protrusion groove of the shift lever.

* * * * *